April 17, 1928.

A. H. HARRIS

VULCANIZER

Filed April 25 1927

Inventor
Archer H. Harris
Knox Hudson & Kent
Attys

April 17, 1928.

A. H. HARRIS

VULCANIZER

Filed April 25 1927

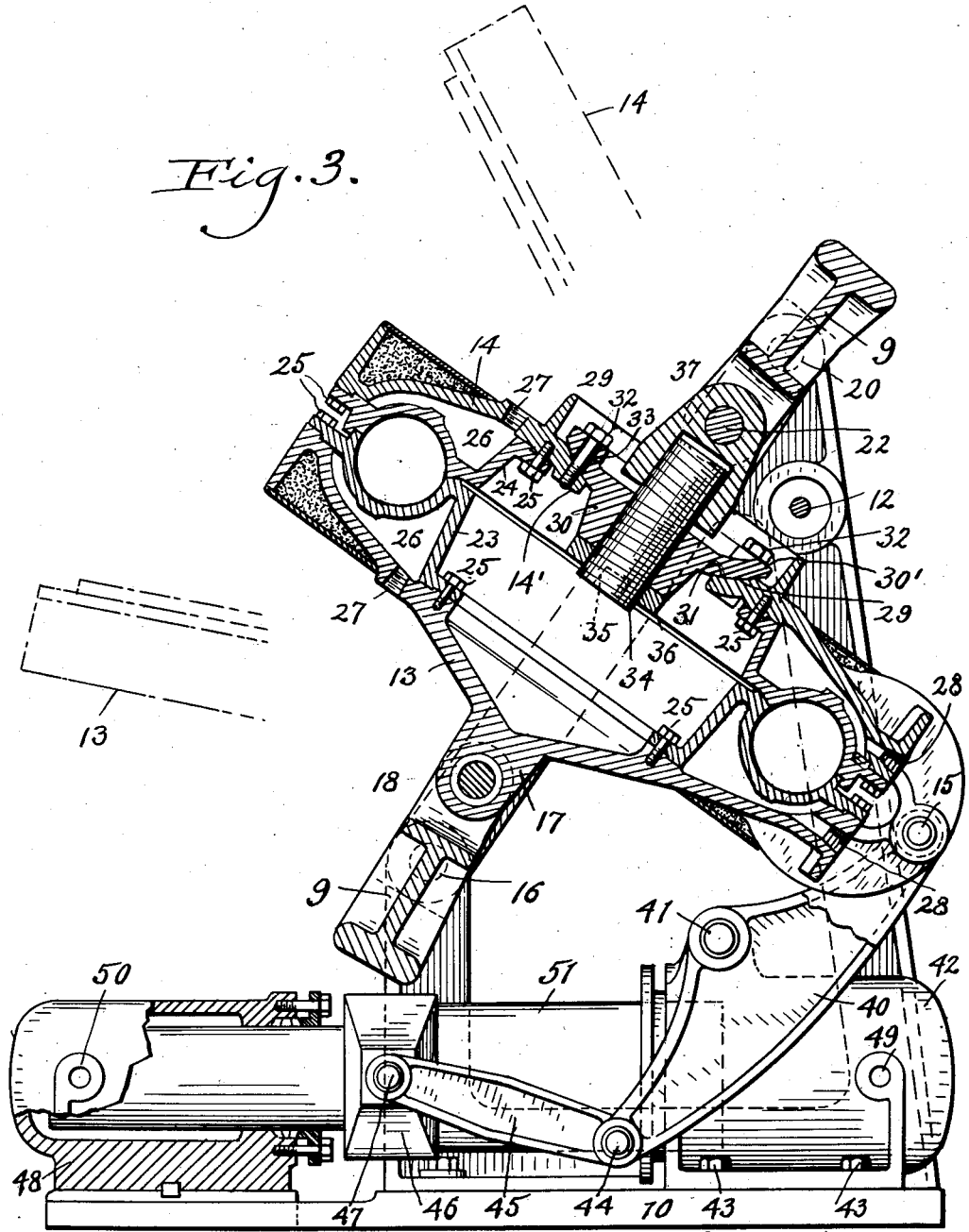

Patented Apr. 17, 1928.

1,666,649

UNITED STATES PATENT OFFICE.

ARCHER H. HARRIS, OF AKRON, OHIO.

VULCANIZER.

Application filed April 25, 1927. Serial No. 186,245.

This invention relates to vulcanizers for use in connection with the manufacture of pneumatic tires and tubes for vehicle wheels.

Heretofore the usual method of making tubes for pneumatic tires has been first to make a satisfactory length of tube and then form it into a circle and then join the ends together. Some tubes have been made by molding them in circular form and attempts have been made to vulcanize such tubes in what is known as the watch case type of vulcanizers. The general character of these watch case vulcanizers is illustrated in the Miller Patent No. 1,234,056, dated July 17, 1917. On account of the molds of the watch case type of vulcanizers being vertically arranged, much difficulty has been experienced in the use of this type of vulcanizer for tubes and particularly for heavy tubes, such as are commonly used with balloon tires. The reason for this is that the tube, prior to being vulcanized, is very soft and the rubber has little or no tensile strength so that when it is placed in the mold in an upright position it tends to sag and stretch the side of the tube which is uppermost with the result that this side will be thinner and weaker than the finished tube.

In the watch case type of vulcanizer, above referred to, it is necessary that the two halves of each mold be forced together under heavy pressure, and the devices for forcing the halves of the mold together and locking them have of necessity been cumbersome and have given difficulty because of the tendency of the molds to warp in service. Moreover, the operations of releasing the locking mechanism, opening the mold, removing the tire or tube and replacing it with another tire or tube and then closing or locking the molds require considerable time which naturally increases the cost and slows up production.

It is one of the objects of the present invention to provide an improved form of individual tire or tube vulcanizer which will eliminate the difficulties that have been experienced in the use of the upright watch case type of vulcanizer, and which will be adapted for rapid opening and closing and in which the requisite pressure of the mold will be obtained by a relatively simple and inexpensive form of mechanism.

A further object is the provision of means for mounting the halves of a watch case mold so as to permit swinging movement, such means incorporating a universal joint or connection whereby inaccuracies in manufacture may be compensated for, and incorporating also means for adjusting one at least of the halves with respect to its swinging support.

Other objects of the invention and the features of novelty will be apparent from the following description, taken in connection with the accompanying drawings, of which:

Fig. 3 is an elevational view partly in section on the line 3—3 Fig. 1.

Figure 1:
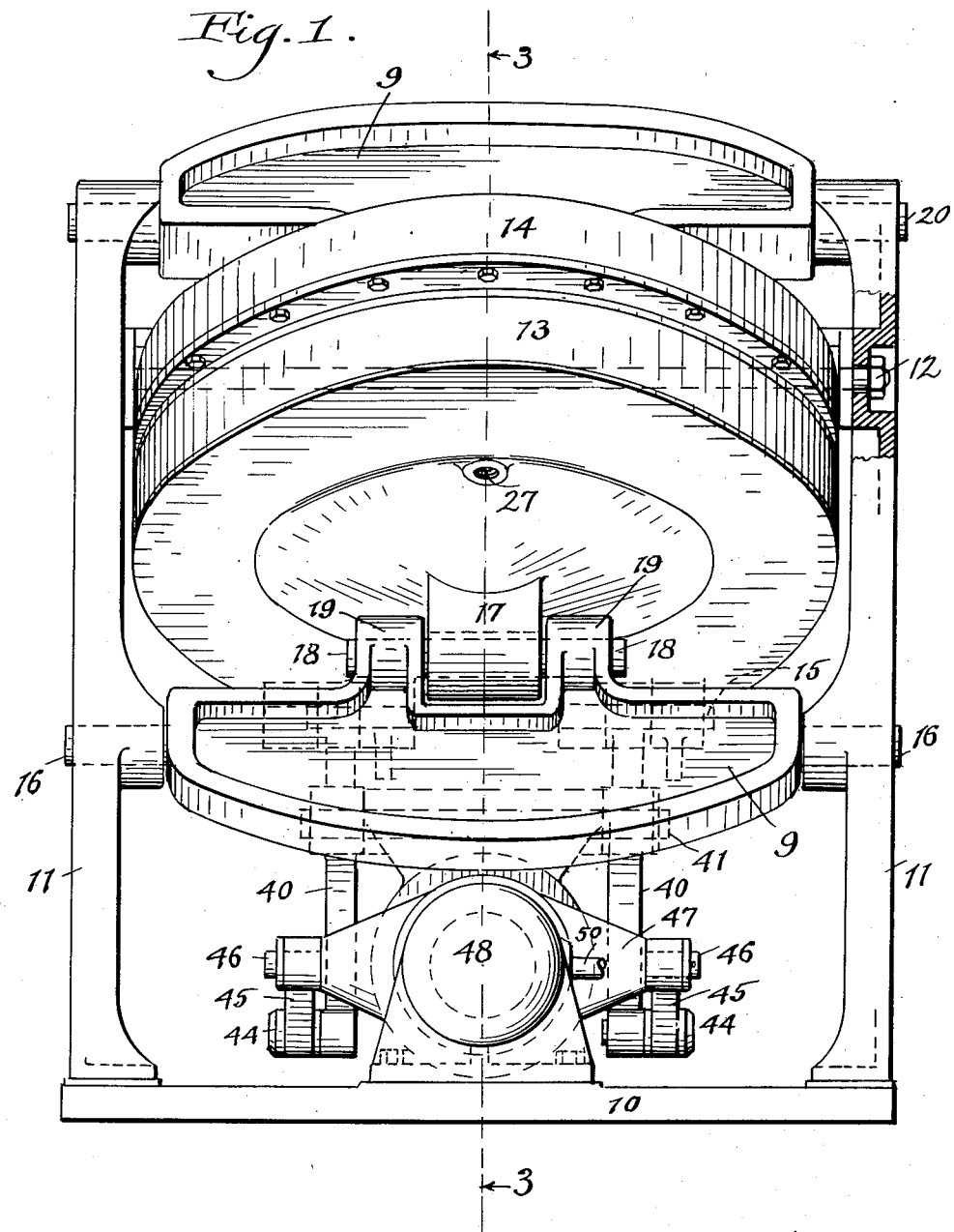
Fig. 1 is a view in front elevation of an apparatus embodying my invention, illustrating the mold in closed position.

In the drawings, 10 is the base and 11 are side members of the frame of the apparatus, the side members being spaced and held together near the top by a bar or bolt 12. The lower and upper mold halves 13 and 14, respectively, are hinged together at 15 and are supported from the frame for swinging movement thereon by means of links 9.

These two links are of similar construction, the lower one having trunnions 16 mounted in bearings in the side members 11 of the frame, and being of I-beam section between the trunnions, the depth of the section increasing from the ends towards the middle so as to give to the link an arched form, whereby its strength is increased and approaches the maximum for the amount of metal employed.

The mold half 13 has a central projecting lug 17 having a drilled hole therein supplied with a bearing for a pivot or pintle 18 which extends also on either side of the lug 17 through projections 19 of the link 9. The upper link 9 has trunnions 20 mounted in bearings in the frame members 11, and has projections 21 carrying a pivot 22 for the support of the upper mold half.

The mold itself is of more or less conventional construction, comprising castings 23 and 24 constituting the tube or tire receiving portions of the mold halves 13 and 14. In the embodiment illustrated, castings 23 and 24 are removably secured to the main castings by bolts 25 or the like, the jacket spaces 26 being adapted to carry the steam for the vulcanizing process which may enter through openings 27 and have its exit through openings 28, the latter being positioned at the lowest parts of the jacket spaces so as to drain off water of condensation.

The upper mold half 14 is open at the center, and surrounding the opening is a flange 14' having a surface 29 of spherical contour. A member 30, which extends through said opening, has an annular flange 30' which is provided with a complementary spherical surface 31, and the two spherical surfaces 29 and 31 are held in engagement by studs 32 which extend loosely through holes 33 in the flange 30' and are threaded into the flange 14'.

The member 30 is bored out at the center and threaded to receive an adjusting screw 34, the opposite ends of which are threaded in reverse directions. The screw 34 may be turned by inserting a properly formed tool into a square opening 35 in the end of the screw, and it may be locked in any adjusted position by means of a lock nut 36. The upper end of the screw 34 has threaded engagement with a member 37, which is mounted on the pivot 22, above referred to. Obviously, the turning of the screw 34 in one direction will separate the members 30 and 37, while the turning of the screw in the opposite direction will cause these members to approach each other.

As the mold pieces move from the closed position shown in Fig. 3 to the open position indicated in the same figure by dotted lines, the hinge 15 and likewise the mold pieces themselves, have a considerable movement bodily. In the present instance, this movement as well as the reverse or mold closing movement is brought about by the use of a fluid pressure mechanism. For the purpose stated, I employ a pair of levers 40 fulcrumed on a pin 41 which is mounted in a bearing on the top of a cylinder 42 which in turn is supported upon and fixed to the base 10, stud bolts 43 being employed for the latter purpose.

To the ends of the levers 40, which are opposite to the hinge 15, are pivoted, at 44, links 45 which connect the levers 40 with a trunnion 46 on a cross head 47. A second cylinder 48 is also mounted on the base 10 of the machine with its axis in alignment with that of cylinder 42. Plungers for the two cylinders 42 and 48 are preferably integral as shown at 51, and support the cross head 46 in the space between the cylinders.

The cylinders 42 and 48 are furnished with ports 49 and 50 with which may be connected conduits for the transmission of compressed air, steam or other motive fluid to and from the cylinders preferably, although not necessarily, by a common control which will admit motive fluid to one cylinder while exhausting it from the other.

Figure 2:
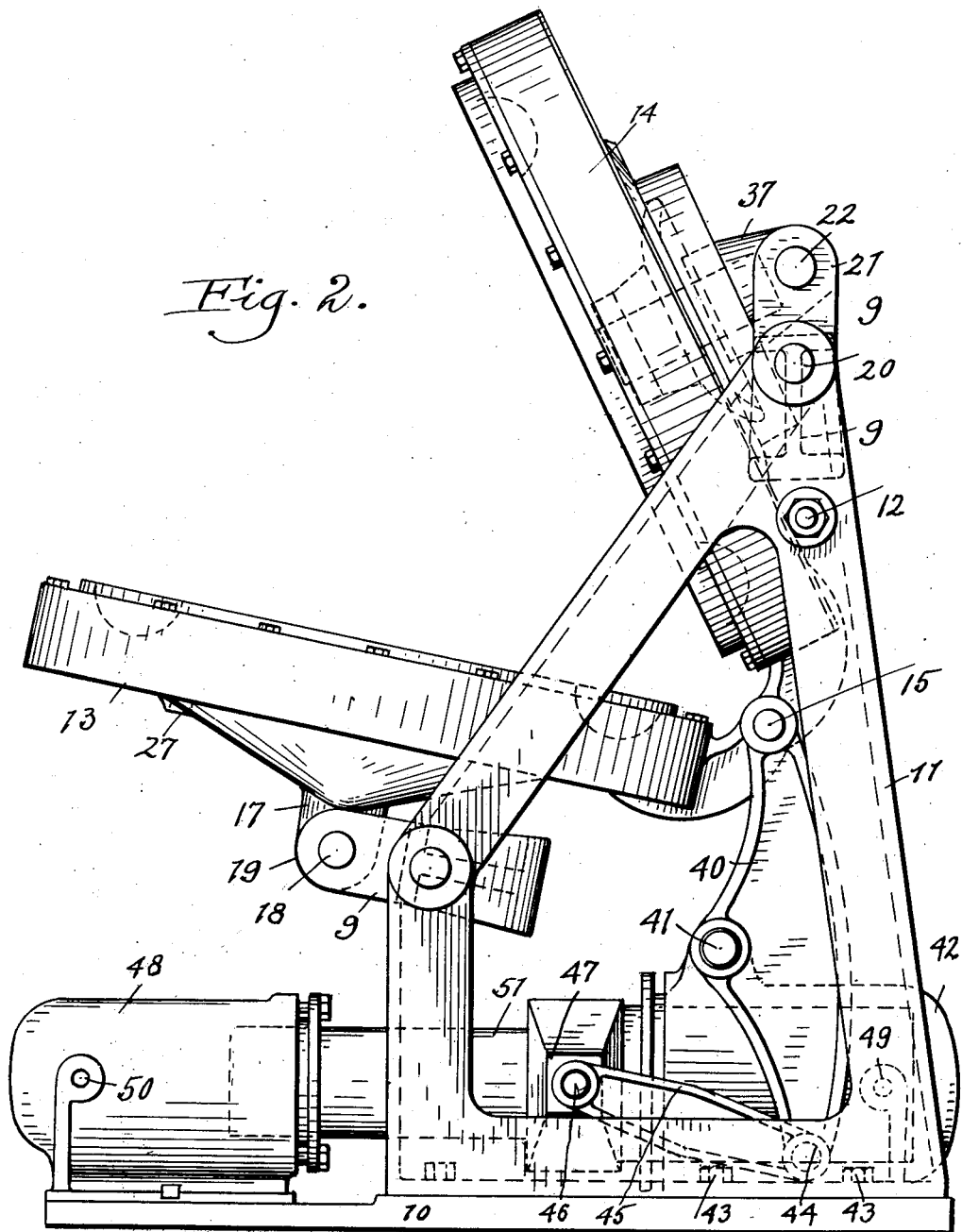
Fig. 2 is a side elevation of the same with the mold open.

Starting with the positions of the parts illustrated in full lines in Fig. 3, the admission of motive fluid through port 50 and the exhausting of motive fluid through port 49 will swing the levers 40 upon their pivot 41 causing the hinge 15 to move bodily toward the left to the position indicated in Fig. 2. At the same time the links 9 turn on their trunnions 16 and 20, thus serving to open the mold to a greater extent. In this position the lower mold half is nearly horizontal, and thus the operator is enabled to place a tube in position therein with facility.

When the motive fluid is exhausted from cylinder 48 and directed into cylinder 42, the double piston 51 then moves to the left and swings the levers 40 into the position shown in Fig. 3, thus swinging the mold halves on their links 9 to the closed position. It will be noted that a line drawn through the centers of the trunnions 16 and 20, Fig. 3, passes slightly to one side of the centers of pivots 18 and 22. The machine is so designed that this condition will always be present. Consequently, the toggle effect of the links 9 will be maintained and take up any tendency toward separation of the mold halves as a result of the pressure within the tube or tire that is being vulcanized.

While the mold is in use, that is while steam is circulating through the jacket spaces 26, pressure is maintained in the cylinder 42 to hold the mold thus tightly closed, and if there should be any distortion in the mold due to heat and pressure while the vulcanizing is proceeding, the pressure in cylinder 42 would act to take up such distortion and maintain the mold tightly closed.

In this connection, it should be noted that the plunger of the cylinder 42 is of considerably larger diameter than that of the cylinder 48 which provides the greater force for closing the mold than is necessary to open it.

The universal connection between the member 30 and the flange 14' provides the necessary adjustment to permit the mold halves to tightly close even though there is some inaccuracy in the manufacture of the various parts of the machine. When the parts are initially assembled, the studs 32 are left loose and pressure is admitted to the cylinder 42 to tightly close the mold. The spherical surfaces 29 and 31 then accommodate the necessary adjustment of the mold half 14 relative to the member 30 to permit the mold halves to properly close and the studs 32 are then carefully tightened to secure the parts together without disturbing the adjustment. The screw 34 may be adjusted to give the desired toggle action for providing the necessary force to maintain the mold closed against the pressure therein.

I claim as my invention:

1. In a vulcanizer of the class described, a pair of mold halves hinged together, pivotal supports for said halves, a lever pivoted to the vulcanizer at the hinge, means for operating the mold halves comprising a power cylinder and piston, and link connections between said piston and lever.

2. In a vulcanizer of the class described, a pair of mold halves, means for moving both of said halves in the opening or closing operations of the mold, said means comprising a fixed power cylinder, a piston therefor, a lever having a fixed fulcrum, a pivotal connection between said lever and both of said mold halves, and a link connecting said lever with said piston.

3. In a vulcanizer of the class described, a mold comprising a pair of mold halves hinged together, a frame work, a link pivotally connecting each half to said frame work, and means for moving said halves upon their supports whereby the halves are swung upon their hinge, said means comprising a fixed cylinder, a piston therefor, a lever having a fixed fulcrum, said lever having a pivotal connection with said mold, and a link connecting said lever with said piston.

4. In a vulcanizer of the class described, a mold comprising a pair of mold halves hinged together, a frame work, means for pivotally supporting said halves upon said frame work comprising a link pivotally connected to one half and to the frame work, means for moving said halves upon their supports whereby the halves are swung upon their hinge to open or close the mold, said last named means comprising a fixed cylinder, a piston therefor, a lever having a fixed fulcrum, said lever having a pivotal connection with said mold, and a link connecting said lever with said piston.

5. In a vulcanizer of the class described, a mold comprising a pair of mold halves hinged together, pivotal supports for said halves, means for moving the mold halves upon their supports to open and close the mold, said means comprising a pair of aligned power cylinders, a pair of rigidly connected pistons for said cylinders, and lever and link connections between said pistons and the said mold.

6. In a vulcanizer of the class described, a mold comprising a pair of mold halves hinged together, pivotal supports for said molds, and means for moving the mold halves upon their supports to open and close the mold, said means comprising a pair of aligned power cylinders, a piston for each of said cylinders, a member connecting said pistons to move in unison, and lever and link connections between said member and said mold.

7. In a vulcanizer of the class described, a pair of mold halves, a hinge connecting said halves, supports for said halves comprising a bar with trunnion ends mounted parallel to said hinge, a pivotal connection between said bar and one of said halves parallel to but offset from said trunnion ends, said bar being provided with an arched portion between the trunnion ends extending from the axis of the trunnion on the side thereof opposite to said pivotal connection.

8. In a vulcanizer of the class described, a pair of mold halves, a hinge connecting said halves, supports for said halves permitting swinging movement of the halves thereon, one of said supports comprising a link, and a pivotal connection between said link and said half, said pivotal connection having a universal mounting upon said half.

9. In a vulcanizer of the class described, a pair of mold halves, a hinge connecting said halves, supports for said halves permitting swinging movement of the halves thereon, one of said supports comprising a link, and a pivotal connection between said link and said half, said pivotal connection having a universal mounting upon said half, and being adjustable toward and away from said half.

10. In a vulcanizer of the class described, a pair of mold halves, a hinge connecting said halves, a frame, means for supporting said halves from said frame so as to have swinging motion thereon, one of said supports comprising a link pivotally connected to the frame and to said half, said last named support including a universal joint by means of which inaccuracies of manufacture are automatically compensated for.

11. In a vulcanizer of the class described, a pair of mold halves, a hinge connecting said halves, a frame, means for supporting said halves from said frame so as to have swinging motion thereon, each of said supports comprising a link pivotally connected to the frame and to the said half, one of said supports including a universal joint by means of which inaccuracies of manufacture are automatically compensated for.

12. A mold half to be used in vulcanizing rubber tubes comprising a body portion having a hole therethrough, said body surrounding said hole having a surface of substantially spherical contour, a block with a complementary spherical surface mounted thereon, fastenings holding said block upon said body portion but permitting slight motion between said spherical surfaces, and means for mounting said halves to permit swinging motion thereof, said means comprising a link pivotally connected to said block.

13. In a vulcanizer of the class described, a pair of mold halves, a hinge connecting said halves, a frame, means for supporting said halves from said frame permitting swinging motion thereof upon the frame, each of said supports comprising a link pivotally connected with the frame and the corresponding half, the pivotal connection between one of said links and the corresponding half being universally supported upon said half.

14. In a vulcanizer of the class described, a pair of mold halves, a hinge connecting said halves, a frame, means for supporting said halves from said frame permitting swinging motion thereof upon the frame, each of said supports comprising a link pivotally connected with the frame and the corresponding half, the pivotal connection between one of said links and the corresponding half being universally supported upon said half, and adjustable toward and away from said half.

15. In a vulcanizer of the class described, a pair of mold halves, a hinge connecting said halves, supports for said halves permitting swinging motion of the halves thereon, one of said supports comprising a link, and a pivotal connection between said link and said half, said pivotal connection being adjustable toward and away from said half.

16. In a vulcanizer of the class described, a pair of mold halves, a hinge connecting said halves, a frame, means for supporting said halves from said frame so as to have swinging movement thereon, one of said supports comprising a link pivotally connected to the frame and to said half, said last named support including means for adjusting the link towards and away from said half.

17. In a vulcanizer of the class described, a pair of mold halves, a hinge connecting said halves, a frame, means for supporting said halves from said frame so as to have swinging movement thereon, each of said supports comprising a link pivotally connected to the frame and to the said half, one of said supports including means for adjusting the pivotal connection between the link and half towards and away from said half.

In testimony whereof, I hereunto affix my signature.

ARCHER H. HARRIS.